Nov. 25, 1969  S. J. POPEIL  3,480,019
ROLLER, CLIP AND COMPOSITION OF MATTER
Filed Dec. 26, 1967  4 Sheets-Sheet 1
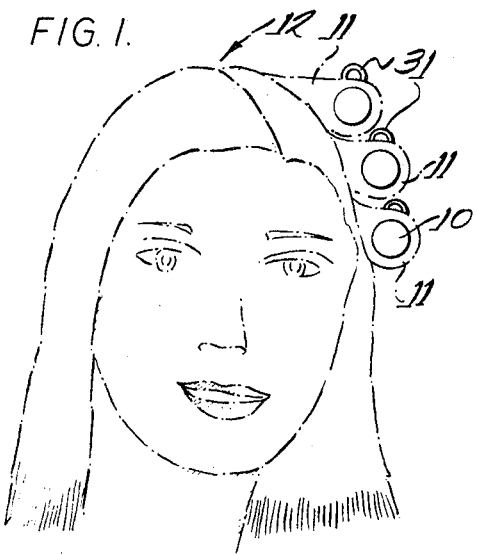
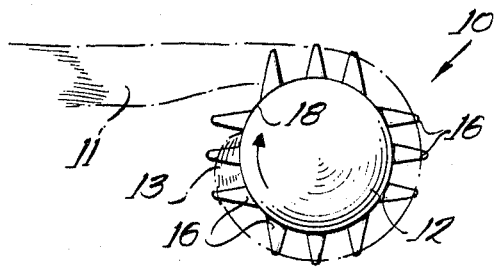
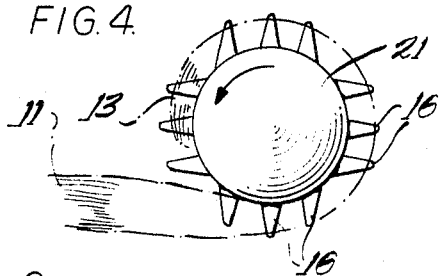
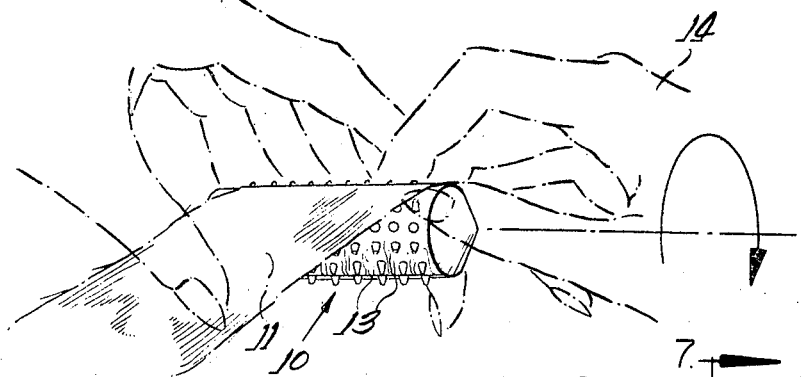
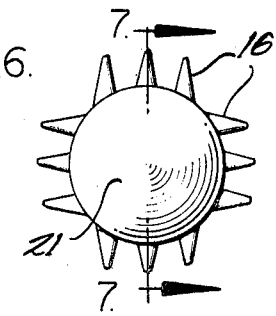
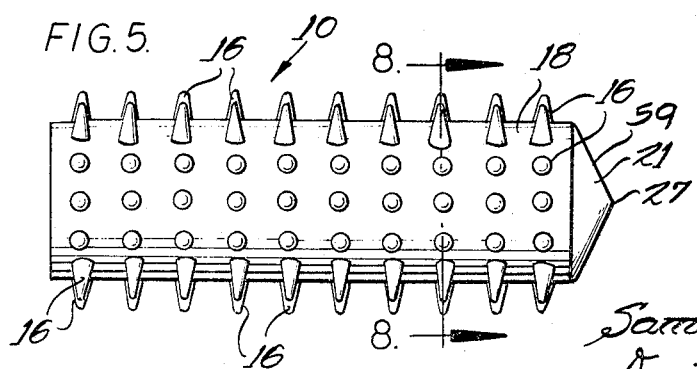

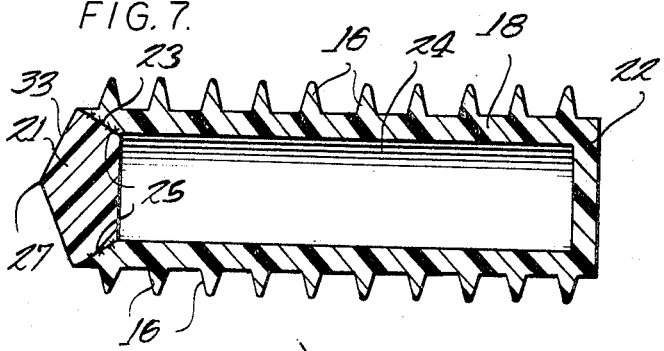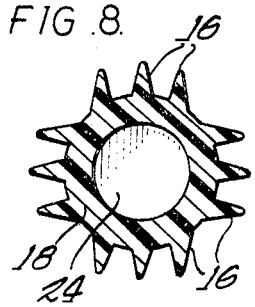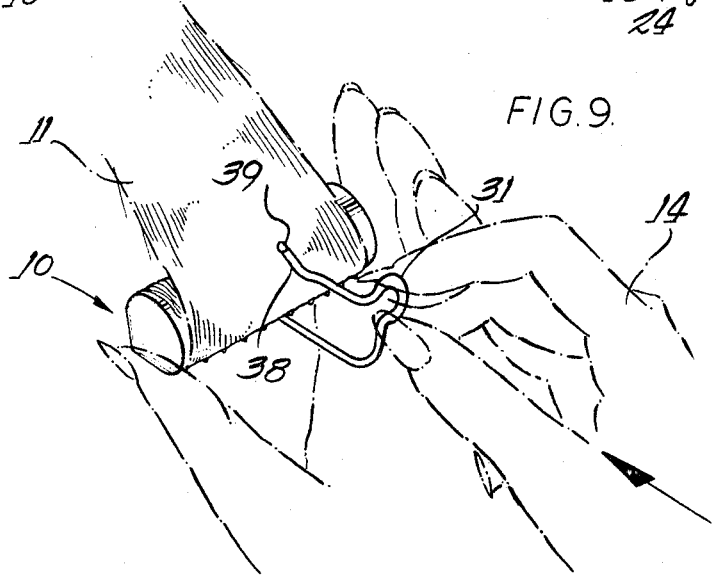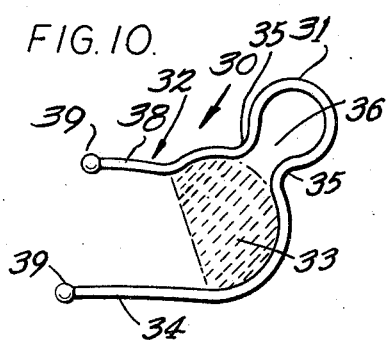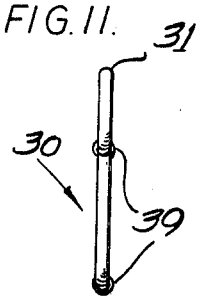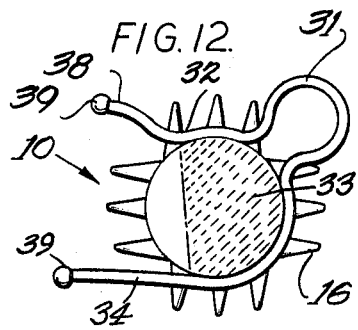

Nov. 25, 1969    S. J. POPEIL    3,480,019
ROLLER, CLIP AND COMPOSITION OF MATTER
Filed Dec. 26, 1967    4 Sheets-Sheet 3
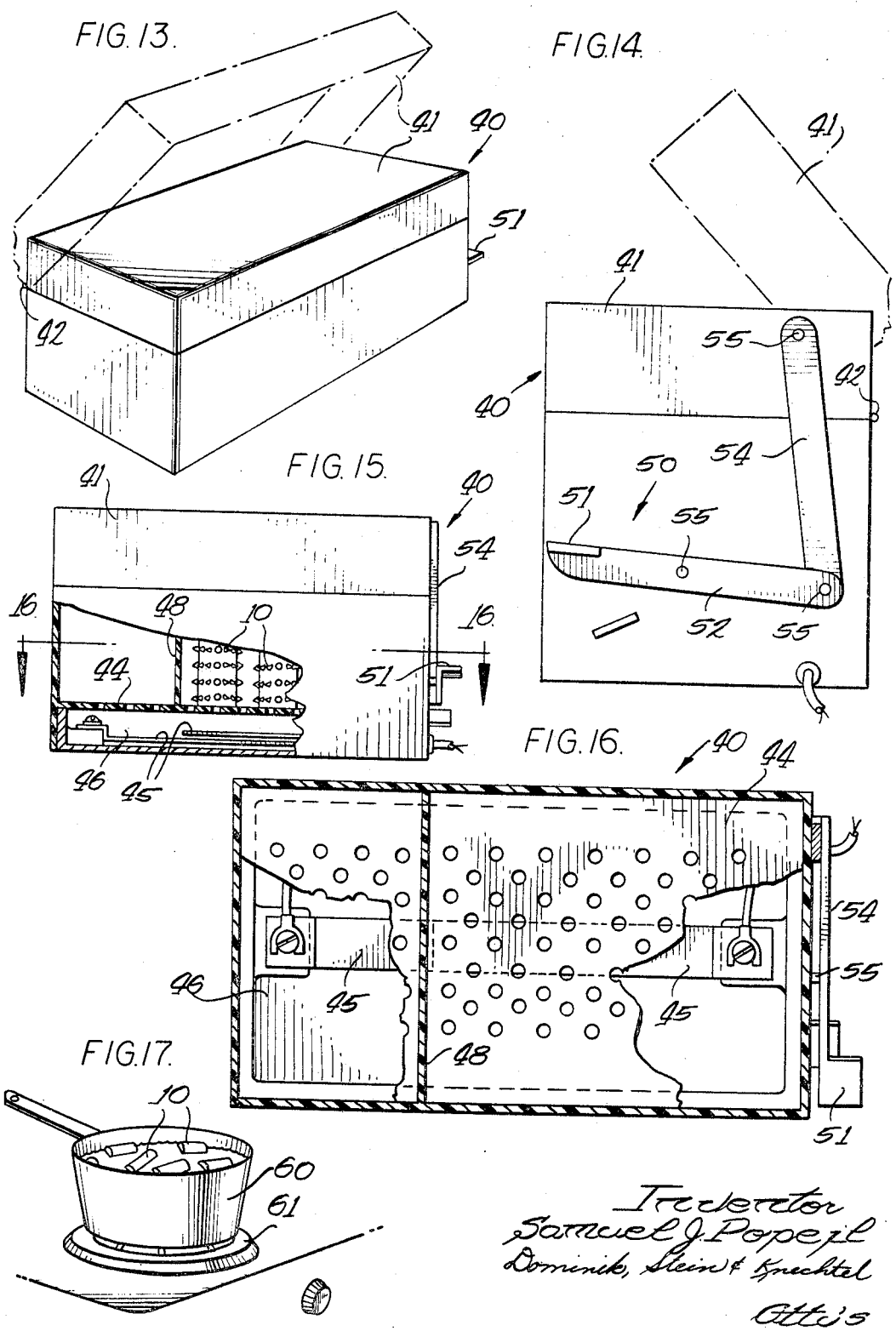

Nov. 25, 1969 S. J. POPEIL 3,480,019
ROLLER, CLIP AND COMPOSITION OF MATTER
Filed Dec. 26, 1967 4 Sheets-Sheet 4

Inventor
Samuel J. Popeil
Dominik, Stein & Knechtel
Atty's

United States Patent Office 3,480,019
Patented Nov. 25, 1969

3,480,019
ROLLER, CLIP AND COMPOSITION OF MATTER
Samuel J. Popeil, 2920 N. Commonwealth Ave.,
Chicago, Ill. 60657
Continuation-in-part of application Ser. No. 551,320,
May 19, 1966. This application Dec. 26, 1967, Ser.
No. 693,432
Int. Cl. A45d 2/12
U.S. Cl. 132—40
9 Claims

ABSTRACT OF THE DISCLOSURE

Improved hair rollers and clips for securing the same, the rollers having a hollow body portion with a plurality of spines extending radially therefrom. The clips have a circular open ended body portion having two legs extending therefrom, and a looped tab on the body portion to provide orientation and resiliency. The rollers are used for setting the hair by heating, preferably by steaming, the hollow rollers, rolling the hair over the rollers, and securing by clips the rolled strands of hair to the rollers until the rollers have transferred their moisture and heat to the hair thereby setting the curl.

---

This application constitutes a continuation-in-part of earlier filed applications, Ser. No. 551,320, filed on May 19, 1966 and Ser. No. 591,939, abandoned, filed on Sept. 6, 1966.

The present invention relates to a roller, a composition of matter for the roller, and a clip, all of which combine in use for setting the hair. In use, the roller is heated preferably by steaming. The hollow rollers have a plurality of spines extending radially from the roller body. Strands of hair are rolled over the rollers and secured by clips until the rollers have transferred their moisture and heat to the hair thereby setting the curl.

Heretofore the practice of setting the hair, waving the hair, and otherwise conditioning a lady's coiffure has been accomplished either by dry hot curling irons, or dry hot curlers, or by the application of a whole host of chemical solutions in combination with dryers and the like. The dry curling equipment such as hot curling irons and dry hot curlers, necessarily imposes hazards in its use, not the least of which is the risk of burning the hands or scalp. Furthermore, the tendency is to split or fray the hair ends and actually dry the hair to a brittle state and break. Those methods of curling and waving the hair employing wave setting lotions or chemical gels may be offensive and indeed injurious to persons having certain allergies.

Recently there have been marketed heated dry rollers which are inserted into the hair to set the same, one being imported from Europe manufactured and sold pursuant to the trademark "Carmen" (see Harper's Bazaar, p. 124, April 1966 issue). Another such hot dry curler is the Curlatron made by the Songrand Co., Kansas City, Missouri. The dry curlers are initially heated to a temperature exceeding that of boiling water. At such elevated temperatures the hot dry curler evaporates the natural moisture from the hair. This drying leaves the hair dull, lifeless, and with loss of body. The hair ends become singed and "frizzy." Electric heating units also require numerous safety features to prevent overheating, thus increasing their cost. (See French Patent 1,362,367). Finally, dry hot curlers actually remove the natural moisture from the hair. This can be readily demonstrated by experiment using one of the electric heating units of the character just described, and observing the amount of moisture retained on the curler roller after it is removed from the hair. For best results in curling and setting the hair, the very opposite procedure should be employed; that is, moisture imparted to the hair simultaneously while heating it so that in the heating or drying process attendant thereto, no natural moisture is removed from the hair.

Steaming with live steam has long been known as a way of curling hair without removing the natural moisture. For example, see United States Patents 1,982,684 and 2,880,299. Steaming the hair has the distinct disadvantage of a risk of scalding the scalp. Furthermore, where steaming is done by use of a steam iron or other complex devices, the advantage of using a plurality of uniform rollers to specially style the hair is lost.

Moisture has always brought out the best in natural life-like hair. Under conditions of exceedingly low relative humidity, the hair loses its natural body or resiliency. Conversely, with normal or excessive relative humidity, the hair will wave and be more easily managed. The present invention stems from the discovery that by steaming, boiling, or otherwise bringing rollers to the temperature of boiling water in an aqueous environment prior to the insertion of the same into the hair, the hair can be effectively set and styled in a safe and efficient manner, and very quickly, due to the transfer of the moisture on the roller surface into the hair as the roller heat is transferred to the hair.

Illustrative of the foregoing, when one of the rollers made in accordance with the invention is first steamed, and removed from a steam chest at its elevated temperature approximating that of boiling water, it may be placed inside an ordinary drinking glass. Within three minutes moisture will gather all over the inside of the drinking glass. When the same roller is placed in the hair, the same amount of moisture is transferred into the hair simultaneously with the transfer of the heat from the roller body. As pointed out above, with the dry hot curlers, natural moisture is removed from the hair. Illustrative of the difference between removing moisture from the hair, and adding the same, is a comparison to the use of a dry iron and a steam iron on animal or vegetable fibers. Using a piece of silk, a linen handkerchief, or a fine woolen, repeated application of a dry hot iron will render the fabric brittle so that it can actually be broken. Conversely a steam iron, even after repeated application to the fabric, will not noticeably damage the same. The same experiment can be made with a long strand of human haid, and with the same results.

In view of the foregoing, it is the principal object of the present invention to provide a roller for setting the hair which simultaneously transfers heat and moisture into the hair, thereby retaining its natural lifelike body. A related and important advantage of the invention follows from the use of a specially adapted clip with an orienting tab which efficiently secures a strand of hair to the roller, the orienting tab permitting the user to easily position the clip by touch.

It is an important object of the present invention to also provide a mechanism for setting the hair in a matter of minutes rather than hours. A related advantage results from the ability to remove the rollers within two or three minutes after they have been inserted and thus there need be no loss of sleep or discomfort from sleeping with rollers.

Because the present invention contemplates steaming or boiling in water to heat the rollers, each roller is sterilized before using so the entire family or others using the same unit at a beauty parlor are hygenically protected.

Another object is to provide hair rollers fabricated of an improved composition of matter which has improved moisture retention characteristics and improved heat retention characteristics.

A further object of the present invention is to provide the roller body with a conically shaped end portion which will shed droplets of hot moisture thereby reducing the possibility of scalding the hand or the scalp, and further dictating an orientation of the rollers within a steam chest so that the conical end is upward to shed the moisture, and the flat end is secured on the base of the steam chest where moisture will not readily gather. A related object of the invention is to provide a hollow, uninterrupted interor to each roller fully sealed by the conically shaped end portion to effectively retain the necessary heat dissipation ability through the critical temperature range for at least three minutes while the hair is tightly wrapped around the roller body.

A further advantage of the present invention stems from the moisture transferred to the hair which retains the natural strength of the hair, rather than promoting a brittle weakened condition as does hot dry curling. A further and related advantage is that the moisture on the surface of the rollers picks up the hair ends more readily and prevents slippage thereby permitting the hair to be rolled tighter and to retain its curl or set longer.

Another advantage of the present invention is the elimination of expensive waving lotions, gels, and the like, which can be injurious to the hair, destroy the natural look and high sheen of the natural hair, as well as prevent touching the hair without damage to the coiffure.

A further advantage of the invention stems from the economy of operation which the user enjoys. Expensive trips to the beauty parlor for hair setting are eliminated. On the other hand, by practicing the present invention, hair can be rolled and set which has been treated with a permanent wave at the beauty parlor, or even bleached. The present invention is equally efficacious with thin hair or thick hair. Accordingly when one uses the apparatus of the present invention excellent results can be anticipated irrespective of the previous condition of the hair. A related additional advantage to the use of the present invention is that when the hair is set in accordance with the invention, it can be immediately reset or modified to achieve the hairdo which is desired by the user.

Still a further object of the present invention is to eliminate the necessity for hair dryers which both dry the hair and the scalp under long periods of dry heat, often times resulting in falling hair and itching scalp which requires further oil treatments, and may result in headaches and irritated nerves.

In the generally accepted commercial beauty shop methods for setting the hair it is first shampooed. The hair is then combed. Thereafter several lotions or gels are applied to the hair. The hair is then combed again. Subsequently rollers are inserted while the hair is wet. A net is placed over the head, and then the customers sits under a hot commercial dryer for approximately 30 minutes or more (home dryers take almost twice as long). After the hair is dry, it is brushed out, teased with a comb, and then sprayed again before styling, and after styling further sprayed. This entire treatment with solutions and fluids renders the hair still and unnatural to the torch. The softness of the hair and its natural feel are lost. Furthermore anywhere from two or three hours of the customer's time can be spent waiting for and in the course of a treatment in beauty shops.

According to the present invention, however, the rollers are placed in a steam chest preferably, or even in boiling water. It is essential to the method that the rollers not exceed the temperature of boiling water before being inserted into the hair, irrespective of how the rollers are heated. Within aproximately 8 to 10 minutes the rollers will have reached their maximum effective temperature and moisture content. Thereafter the ends of the hair are placed on the moist exterior of the roller and the balance of the strands of hair tightly wrapped around the roller. When the wrapping is completed the hair is clipped in place on the roller, and a second roller removed from the steam heating unit and similarly placed in other strands of hair.

Within two minutes after the hair has been on the roller, the retained moisture from the roller will be transferred to the hair and the higher temperature transfer range traversed. At this time the hair is already set and the moisture dissipated by roller heat evaporation. It is essential to the setting that the roller not cool to less than 150° F. during the first two minutes. Nevertheless, for best results, and a self-monitoring time schedule, the person treating the hair will wait until all of the rollers have been placed in position. This normally takes ten to fifteen minutes for an average of fifteen to twenty rollers. Thereafter the rollers are removed from the hair on a first-on, first-off basis.

After the last roller has been removed, the hair may be brushed or combed or otherwise treated in accordance with conventional techniques. Should one particular area of their hair require further setting or modification, the first rollers removed may be reheated and wetted by the time the hairdo has had its first inspection, and may be re-inserted for reshaping in accordance with the user's preference.

Because of the spines of the rollers are arranged symmetrically, not only can the roller of the invention be employed to comb and untangle the hair before rolling it on, but it similarly avoids a tangling action of the hair when the rollers are removed. Furthermore, the combination of moisture and heat imparts a body or springy resiliency to the hair coupled with a permanence of the curl which renders teasing unnecessary, but only optional for styling. This very same body in the hair renders it easier to style, and to retain the style which is desired with a natural unchemically treated appearance. Nevertheless the use of the method of the invention and its equipment for styling the hair does not preclude subsequently spraying where the lady desires it. Best results are achieved when the hair is normally dry before setting. Nevertheless, even with heavy hair after shampooing, if the hair is dried for a short period of time with a towel and followed by a dryer, it can still be very effectively set with the equipment and method of the present invention.

Further objects and advantages and details of the present invention will become apparent as the following description proceeds accompanied by the explanation of the details of the illustrative drawings in which:

FIG. 1 is a diagrammatic view of the rollers partially inserted in a lady's hair in the manner illustrative of the present invention.

FIG. 2 is a perspective partially diagrammatic view showing how the hair is wrapped upon a roller.

FIG. 3 is an end view of the roller illustrating how the hair is rolled underneath.

FIG. 4 is a view similar to FIG. 3 illustrating how the hair ends are rolled over the top of the roller.

FIG. 5 is a front elevation of a roller illustrative of the structure of the present invention.

FIG. 6 is an end view in the same scale as that of FIG. 5 of the roller shown in FIG. 5.

FIG. 7 is a longitudinal sectional view of the roller taken along section line 7—7 of FIG. 6.

FIG. 8 is a transverse sectional view of the roller taken along section line 8—8 of FIG. 5.

FIG. 9 is a diagrammatic perspective view illustrating how the clip is placed in position on a strand of hair to tightly retain the hair strand against the roller after the hair has been rolled on the roller.

FIG. 10 is a front elevation of a clip of the character shown diagrammatically in FIG. 9.

FIG. 11 is an end view of the clip shown in the same scale as FIG. 10.

FIG. 12 is a front elevation of the clip shown in FIGS. 9 through 11 inclusive, illustrating its conformed relationship to the roller.

FIG. 13 is a perspective partially diagrammatic view of a steam chest of the character useful in preheating and steaming the rollers.

FIG. 14 is an end view of the steam chest shown in FIG. 13 illustrating diagrammatically how a linkage mechanism may be employed to pen the lid portion for removing the rollers.

FIG. 15 is a front elevation in reduced scale of the steam chest shown in FIGS. 13 and 14, partially broken to illustrate the interior structure.

FIG. 16 is a longitudinal sectional view of the steam chest taken along section line 16—16 of FIG. 15 looking downwardly on the heating element and base of the roller.

FIG. 17 is a perspective view illustrating an alternative form for heating and moistening the rollers.

Figure 18:
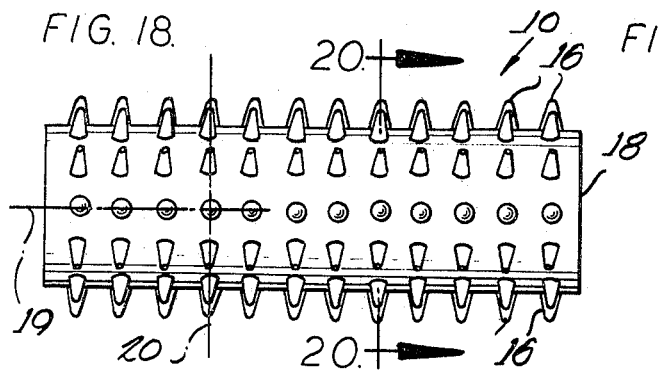
FIG. 18 is a front elevation of a roller illustrative of the structure of the present invention.
Figure 19:
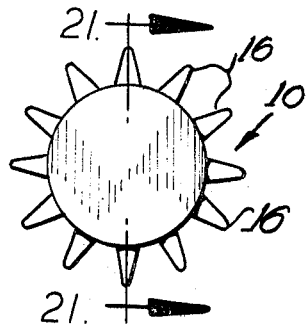
FIG. 19 is an end view in the same scale as that of FIG. 18 of the roller shown in FIG. 18.

The apparatus preferably employed in the method of the invention comprises a roller 10 and means for heating the same not to exceed the boiling temperature of water. While the heating may be accomplished by boiling the roller in water (see FIG. 17), it is preferred that a steam chest 40 (see FIGS. 13 to 16) be employed which will assure heating and surface retention of distilled water. Before turning to the specific configuration of the roller 10 and steam chest 40, they will be discussed generally in terms of the material and the properties which are desirably exhibited by the material and the particular configuration. While certain plastics are discussed extensively, other materials with comparable heat and moisture retention characteristics are contemplated.

Test results have indicated that it is important that the roller body 18 retain a temperature in the range of 185° F. to 150° F. for 2 minutes. Employing a generally annular cylinder of 2″ to 4″ in length, and approximately 1″ in diameter with a body wall in the range of ⅛″ to ¼″ will produce a satisfactory usable and manageable roller. When the roller is hollow with closed ends superior thermal results are achieved. Whatever plastic material is employed for molding the rollers should be stable at sustained temperatures in excess of 212° F. Polypropylene will exhibit good temperature characteristics particularly when hollow and both ends are sealed. The addition of talc to polypropylene in a 40% composition by weight exhibits excellent moisture and heat retention properties. A material marketed under the trademark "Delrin" which is a generally acetal material produces excellent results. The hollow roller 10 with an uninterrupted interior having closed ends is most desirable thermally, and also because of its lighter weight and lower material cost as compared to a solid roller.

The following tables are indicative of the temperature curve at average room temperatues when "Delrin" with a cored center but open end, and a cored center with closed ends respectively have been employed after rising to the temperature of boiling water and removing:

|  | Open end Delrin-cored (deg.) | Closed end Delrin-cored (deg.) |
| --- | --- | --- |
| Removal | 190 | 190 |
| 15 seconds | 190 | 180 |
| 30 seconds | 185 | 178 |
| 45 seconds | 182 | 178 |
| 1 minute | 177 | 178 |
| 1 minute 15 seconds | 173 | 176 |
| 1 minute 30 seconds | 169 | 176 |
| 1 minute 45 seconds | 166 | 175 |
| 2 minutes | 163 | 173 |
| 2 minutes 15 seconds | 160 | 172 |
| 2 minutes 30 seconds | 157 | 170 |
| 2 minutes 45 seconds | 155 | 168 |
| 3 minutes | 153 | 166 |
| 3 minutes 15 seconds | 151 | 165 |
| 3 minutes 30 seconds | 148 | 164 |
| 3 minutes 45 seconds | 145 | 162 |
| 4 minutes | 144 | 161 |

It will be noted that in all instances the temperature at the end of two minutes was in excess of 160° F., but that the "Delrin" with an open end cored center achieved a slightly higher initial temperature. With the hollow roller having closed ends, a thinner wall section may be employed to arrive at the same temperature characteristics as above with the open ended roller. As indicated above, the net result is a lighter, more comfortable roller with a lower cost and superior curling characteristics.

Material such as polyethylene have low water retention characteristics, and accordingly are less desirable. Furthermore, such materials as styrene and polystyrene distort at relatively low temperatures, and thus are less desirable, even though less expensive. In addition, their water retention characteristics are also relatively low.

Nylon has good water retention characteristics and temperature characteristics, but is considerably more expensive. A preferred material for the rollers 10 is polypropylene with an additive of 40–50% by weight of talcum powder. If more than 50% of the talcum powder is used, the spines 16 thereon (described more fully below) become brittle and break and the general strength of the rollers is reduced. If less than 40% of the talcum is used, the heat retention characteristics of the polypropylene are substantially reduced.

Talcum powder has heretofore been added to polypropylene to improve its dimensional stability and stiffness, and also has been recommended to improve heat distortion and to minimize sink marks. The fact, however, that it can be used for the purpose of retaining moisture and a high latent heat as employed with the rollers 10 of the present invention has never been recognized nor employed.

With rollers 10 formed of polypropylene and the talcum powder additive, in approximately 2 minutes, all of the moisture is transferred from the rollers and yet the temperature of the rollers remains between 185° and 150° for 4 to 5 minutes. Thus, the talcum polypropylene rollers have the temperature retention characteristics and good moisture transfer characteristics important to fast setting. In addition, the rollers do not distort at sustained temperatures of boiling water.

Rollers 10 fabricated of the polypropylene with the talcum powder additive also provide substantial economic advantages. Ordinary polypropylene costs in the range of 20 to 25 cents a pound. With the talcum powder additive, it costs approximately 27 cents a pound. Delrin, while prior to the discovery of the advantages provided by polypropylene talcum powder mixture, was considered a preferred material and costs 70 to 80 cents a pound. The characteristics of the polypropylene talcum powder mixture are superior to those of Delrin, hence both substantial savings in cost and improved operating characteristics are realized.

Rollers formed of polypropylene with a talcum powder additive also exhibit an off-white color somewhat pearlescent. This color matches quite closely the color of an end cap 21 (described below) formed of pure polypropylene so that the finished rollers have an attractive appearance.

As new and different plastics, metal, alloys and sintered materials are developed, there will undoubtedly be improved materials which can be employed. It will still remain essential to the invention that the roller have good temperature retention characteristics, moisture transferring characteristics, and not distort at sustained temperatures of boiling water. The best results are achieved when the roller will remain within the range of 175° F. to 185° F. for the first two minutes after being taken from a 212° F. aqueous environment, and still have a temperature of 150° F. three minutes after such removal.

The above results can be shown by way of improvement and comparison with the typical electrically heated dry rollers of the type referred to above. In the table below, a typical dry curler was removed from its electrical heating unit after two minutes of heating and its temperature read for 15 minutes (the first minute appearing in 15 second intervals). The figures set forth below are to be contrasted with a polypropylene roller made in accordance with the invention which has a hollow uninterrupted interior, a conical sealed end cap, and a plurality of spines exemplary of the present invention, after the same had been heated for ten minutes in a steam chest:

| Time after removal | Hot dry curler (deg.) | Roller illustrative of the invention after 10 min. in steam chest (polypropylene with sealed ends) (deg.) |
| --- | --- | --- |
| 15 seconds | 325 | 174 |
| 30 seconds | 360 | 172 |
| 45 seconds | 355 | 168 |
| 1 minute | 350 | 163 |
| 2 minutes | 308 | 157 |
| 3 minutes | 270 | 153 |
| 4 minutes | 243 | 149 |
| 5 minutes | 218 | 144 |
| 6 minutes | 200 | 138 |
| 7 minutes | 178 | 134 |
| 8 minutes | 163 | 130 |
| 9 minutes | 152 | 126 |
| 10 minutes | 142 | 121 |
| 11 minutes | 134 | 117 |
| 12 minutes | 127 | 115 |
| 13 minutes | 121 | 112 |
| 14 minutes | 116 | 110 |
| 15 minutes | 112 | 107 |

It will thus be seen that the hot dry curler actually can remain in the hair for a full five minutes at a temperature above that of boiling water, and accordingly literally steams the moisture out of the hair. The very opposite is the case with the illustrative polypropylene roller, where during the first three minutes in a temperature range beneath that of boiling water, it transfers its heat as well as moisture into the hair, the moisture dissipating naturally to set the curl without removing the natural moisture from the hair.

More specifically, it will be noted that the embodiment of the roller 10 as disclosed in the drawings has an exterior cylindrical roller body 18. The outer face of the body 18 is preferably smooth to reduce the tendency to tangle the hair upon unwinding. A plurality of spines 16 are integrally molded into the body 18 and extend therefrom radially a distance anywhere from 5% to 15% of the diameter of the cylinder and approximately the thickness of the body. The spines are desirably on centers 30° or less.

Best results have been achieved when the spines 16 are oriented in longitudinal spine rows 19 and circumferential spine rows 20 symmetrically arranged with 10 spines in each direction. The symmetrical arrangement of the spines 16 offers the twofold advantage of permitting a combing of the strand of hair before it is rolled on the roller, and also reducing the tendency for the roller to tangle in the hair before unrolling. Furthermore, it will be noted that the outer circumferential rows of spines are oriented closely to the ends of the roller body 18 so that the rollers can be gripped by the hands at their very ends without the fingers touching the roller body 18. The natural action of the user is therefore to shape the strand inwardly thereby reducing the tendency of the outer strands to slip over the ends of the roller. The ends of the spines 16 are dull to prevent scalp irritation and make them more comfortable to handle. The smooth finish on the spines 16 further inhibits tangling.

After the rollers are removed from the hot aqueous environment they do not burn the fingers while rolling the curl because the fingers contact only the spine ends. The body portion 18, however, must necessarily remain hot as long as possible. By arranging the spines in the manner disclosed, comfortable handling is achieved almost immediately after removal. As to size, the diameters of the roller body 18 can vary between ⅝" to 2". An ideal length is approximately 3", with the tips of the outer spines spanning at least 2½". In the average kit, 12 of the larger diameter rollers will be employed, with 6 of a smaller size. Naturally, this mix will vary in accordance with the user depending upon the texture and the amount of hair as well as the hair style to be set.

Figure 20:
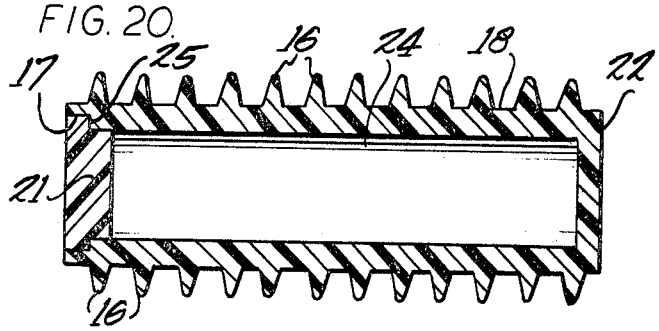
FIG. 20 is a longitudinal sectional view of the roller taken along section line 20—29 of FIG. 19.
Figure 21:
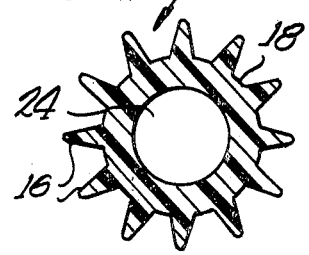
FIG. 21 is a transverse sectional view of the roller taken along section line 21—21 of FIG. 18.
Figure 22:
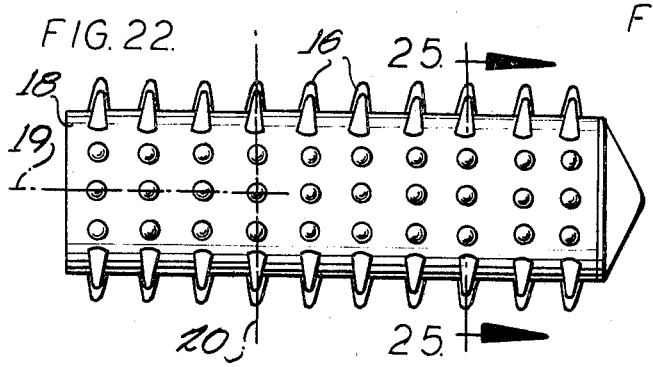
FIG. 22 is a front elevation of a roller illustrative of the structure of the present invention.

From a manufacturing standpoint, the roller body 18 is molded with a hollow uninterrupted core 24, and a closed end 22. A recessed collar 17 (FIG. 20) is molded into the open end of the roller body 18, and an end cap 21 with a stepped end cap shoulder is provided to close the open end of the roller body 18. Alternatively, and preferably, the end cap 21 terminates in a point or peak 27 defined by a conical face 59, as illustrated in FIG. 5. It is desirable that the included angle of the taper approximate 120° and that the conical face 59, as illustrated in FIG. 5. It is desirable that the included angle of the taper approximate 120° and that the conical face 59 have a polished surface to inhibit the deposit or retention of large droplets of hot water. The end cap 21 can be affixed to the roller body 18 in several different fashions. For example, it is pressure fitted as shown in FIG. 20. Alternatively, a tapered shoulder 23 can be molded into the open end of the roller body 18, and a mating tapered end cap shoulder 25 formed on the end cap 21, as illustrated in FIG. 7. The inter-face defined by the conical shoulders 23, 25 is spin welded by rotating the end cap 21 in accordance with accepted manufacturing techniques.

Figure 24:
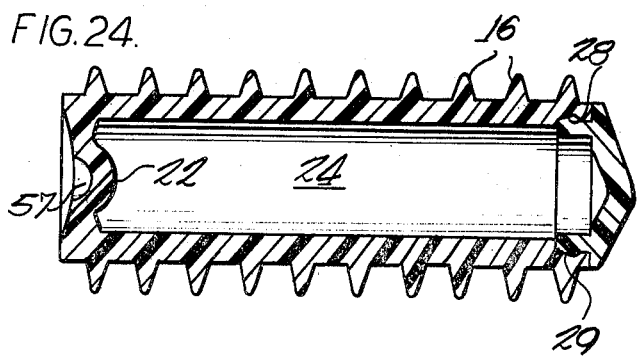
FIG 24 is a longitudinal sectional view of the roller taken along section line 24—24 of FIG. 23.
Figure 25:
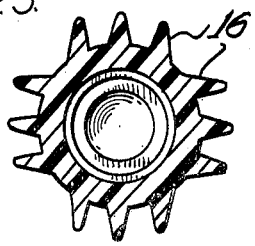
FIG. 25 is a transverse sectional view of the roller taken along section line 25—25 of FIG. 22.

A preferred fit results from molding a recessed annular locking groove 28 into the open end of the roller body 18, and a mating raised annular locking collar 29 on the end cap 21, as illustrated in FIG. 24. With this construction, the end cap 21 can be easily and quickly snap-fitted to the roller body to assemble a roller 10. Whether high speed spinning or snap-in techniques are used to accomplish the tight fit at the inter-face, it is most important that a near watertight seal be effected.

Figure 23:
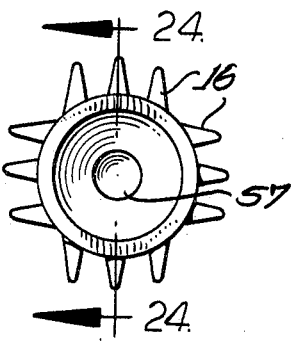
FIG. 23 is an end view in the same scale as that of FIG. 22 of the roller shown in FIG. 22.

The closed end 22 of the roller body 18 also preferably and advantageously has a self-contained measuring cavity 57 formed in it (FIGS. 23 and 24) which is proportioned to measure out the proper amount of baking soda to add to one cup (approximately 8 ounces) of distilled water, to provide the proper amount of ionization and conductivity to the water. In certain areas, by experiment, the user will determine that ordinary tap water has sufficient conductivity to generate steam quickly and efficiently. In areas where the water is extremely hard, by using distilled water and adding one measuring cavity full of baking soda, cleanliness and uniformity of operation can be achieved. At least one roller in a set desirably utilizes the measuring cavity.

It will also be appreciated that each separate end plug can be colored to code the size of the roller, and because of the taper at one end of the roller, the roller must be properly oriented with the colored end upward so that the user can quickly determine the size of roller she is grasping. In addition, of course, because the tapered end is upward, the tendency to retain hot moisture droplets which could scald the hand or the scalp is virtually eliminated.

As will be noted in FIGS. 3, 4, 5, 6 and 8, the 12 rows of spines 16 are oriented in four separate directions. This configuration is desirable from a molding standpoint, but not essential to the invention. Just as readily the 12 rows of spines could all be oriented radially from the center of the roller body 18. What is important, however, is that there be a symmetrical orientation of the spines 16, that the length of the longitudinal rows of the spines 16 be at least 2½", that the hollow core 24 be uninterrupted, and that the interior of the core 24 be effectively sealed against leakage of moisture by means of the attachment of the end cap 21 to the roller body 18.

Irrespective of the type of roller employed, when a lady is setting her own hair, there is always a problem of securing the tightly wrapped hair strand in place. This is particularly true when setting the hair at the rear of the head, where the sense of touch is the only guide available when self-setting techniques are employed. Thus, it is highly desirable to have a hair clip which not only will secure the hair tightly in its wrapped configuration about the roller, but also be easy to insert, locate and remove. Turning now to FIGS. 9 through 12 inclusive, it will be seen that a hair clip 30 has been provided which has a looped tab 31 which serves the two-fold purpose of providing resiliency to the clip 30, and also rendering it easy to locate, insert and remove. Referring to FIG. 1, it will be seen there that the looped tabs 31 remain at the outside of the roller, and are easy to observe as well as physically locate.

The looped tab 31 is generally circular terminating in neck bends 35 which define a looped tab neck 36. Extending from the looped tab neck 36 are outer leg 32 and inner leg 34. The base portion of the legs 32, 34 define a arcuate-shaped roller body clamping portion 33 (shown in shaded lines in FIGS. 10 and 12). A clamp opener portion 38 is reversely bent at the open end of the outer leg 32, and engages the roller body in the manner shown in FIG. 9, thereby springing the two legs 32, 34 outwardly to thereby receive the strand of hair and roller 10. The blunted ends 39 formed at the tips of the legs 32, 34 are provided to prevent scratching, and assist in rendering the insertion of the clip 30 an easier task.

More specifically it will be seen in FIG. 2 that the user is able to hold the roller 10 and manipulate same with the fingers of one hand 14 twisting the same, and the other hand 15 guiding the hair strands to curl tightly in the roller 10. As illustrated diagrammatically in FIGS. 3 and 4, the fine ends 13 of the hair strand 11 adhere to the roller body 18 because the peripheral portion of the body is moist after having been removed from the steam chest 40 or boiling water. Because the hair ends 13 adhere closely to the roller body 18, a much tighter wrap can be achieved, the balance of the hair strand 11 reinforcing the tightness of the curl until the roller 10 approximates a contact position with the scalp 26 as shown in FIG. 1. At this point the clip 30 is positioned with the legs circumferentially opposed over the roller 10 as shown in FIG. 12. The symmetrical orientation of the spines 16 of the roller 10 divides the hair stand 11 into separate segments between the spines. This orients the clip 30 and prevents the hair from slipping sideways, thereby insuring a tightly retained curl.

As set forth above, the preferred embodiment contemplates that the interior of the roller 10 have a hollow core 24 with closed ends, but limited effective curling results may be achieved in the event one end is open or both ends are open, so long as the roller is first steamed or boiled, or otherwise subject to an aqueous environment at approximately the boiling point of water.

Referring now to FIGS. 13 through 16, a steam chest 40 is shown which will effectively steam the roller 10 in accordance with the method of the invention. As shown in FIG. 13 the steam chest 40 has a lid 41 which is secured at its rear portion by means of hinges 42 to the body 43.

The lid 41 may be raised by means of the lid release linkage 50 which opens up the interior where the rollers (as shown in FIG. 15) set upon a perforated base 44. Beneath the perforated tray 44 is a water trough 46 which is filled with water. A pair of heating elements 45 are within the water trough, and serve as a safety in that the circuit for heating is not closed unless the elements are submerged in water.

A divider wall 48 may be provided, or several, to divide various sizes of the rollers.

As noted in FIG. 14, the lid release linkage 50 may be activated by a finger tab 51 with one hand. The finger tab 51 is on the tab crank 52 which is pivoted at a central pivot 55, so that when it is depressed, the end pivot 55 activates the lid lever 54 which is in turn pivotally connected to the lid 41. Therefore, by pressing the finger tab 51, the lid 41 is opened to the position as shown in the phantom lines in FIG. 14.

An alternative form of heating the rollers, most simple, expeditious, and yet useful, is shown in FIG. 17. There a pot 60 is selected by the user from many cooking pots, filled with water, and heated over a conventional stove burner 61. Since the rollers 10 are hollow, they will float on top of the water and can be picked out by kitchen tongs or any other conventional method after they have been boiled for approximately 8 to 10 minutes. Since the rollers are light in weight, and only boiling water is required for use, they are ideal for travel use.

Because the method of the invention requires steaming or boiling the rollers, the temperature of each roller is automatically controlled not to exceed 212° F. Depending upon the hardness of the water, steaming between 10 and 12 minutes is preferred for best results. When the roller has been properly steamed, and removed, all of the moisture will evaporate off its surface in one minute or less when exposed to ambient environment out of the hair. Naturally the same roller placed promptly in the hair will first transfer its moisture to the hair, and then give up the balance of its heat in setting the hair.

When hard water is used to generate the steam, the natural action of evaporation and condensing steam insures that the rollers 10 will only be contacted with pure distilled water. Thus the hair is uniformly treated in terms of temperature as well as the type of moisture which contacts the hair. Furthermore, as set forth in the objects of the invention, each roller is necessarily sterilized before use, and cannot be effectively used until it has been sterilized.

While the invention has been described in connection with specific embodiments and applications, it is not applicant's intention to restrict himself thereto, but to include within the invention all of the subject matter defined by the spirit as well as the letter of the annexed claims.

I claim:

1. A roller for use in setting the hair comprising, in combination, a cylindrical body, said body being formed of material which comprises polypropylene having talcum powder within the range of 40–50% by weight added thereto having heat retention characteristics permitting the same to retain a temperature between the range of 150° F. and 185° F. for two minutes at room temperature, said material further having the property of resisting distortion at sustained temperatures at least as high as the boiling point of water and retaining surface moisture for transfer to the hair, the material being formed into a generally annular hollow uninterrupted closed cylindrical configuration having a tightly closed hollow interior and a plurality of spines integral with the roller body and extending outwardly therefrom, the hollow interior promoting heat retention and reduced weight thereby lessening discomfort to the user of many rollers simultaneously.

2. A hair roller of the character defined in claim 1 above in which the spines extending outwardly therefrom are oriented in longitudinal and circumferential symmetrically spaced rows.

3. In the hair roller of the character defined in claim 1 above, a plurality of spines oriented circumferentially, and 12 spines oriented longitudinally, the spines adjacent the end portions of the roller being spaced from said ends at a distance not more than the distance between the rows of spines, all said spines being symmetrically spaced.

4. In the hair roller of the character defined in claim 1 above, one closed end portion thereof defining a conical exterior face to shed large water droplets therefrom.

5. A hair roller of the character defined in claim 1 above wherein one end portion thereof has a recessed cavity therein which is proportioned to measure a proper amount of baking soda to be added to one cup of distilled water for most satisfactory operation.

6. A clip in combination with the roller of claim 2, said clip having an arcuate-shaped smooth roller clamping portion defined by a yieldable curved member terminating in inner and outer legs, and a loop integral with the arcuate-shaped portion to define a looped tab for manipulating the clip and securing the same circumferentially on a roller, said clip being formed of a single piece of wire material, whereby the clip is applied snap-actingly transverse to the roller to retain a strand of hair wrapped tightly about the roller.

7. In the clip of claim 6 above, an outwardly bent clamp opener portion at the end of the outer leg.

8. A roller for use in setting the hair comprising a generally cylindrical body formed from a material comprising polypropylene having talcum powder within a range of 40–50% by weight added thereto, and a plurality of spines integral with the roller body and extending outwardly therefrom, said talcum additive serving the twofold purpose of maximizing heat and water retention when the roller is heating in an aqueous environment to approximately the temperature of boiling water.

9. A hair roller of the character defined in claim 8 above, wherein the material further is formed into a generally annular hollow cylindrical configuration having an uninterrupted hollow tightly closed interior thereby reducing the weight of the roller, the hollow tightly closed interior promoting heat retention.

References Cited

UNITED STATES PATENTS

| | | | |
|---|---|---|---|
| 1,473,749 | 11/1923 | Vandamark | 132—42.1 |
| 2,473,115 | 6/1949 | Vaughn | 132—41 |
| 2,582,550 | 1/1952 | Madore | 132—33 |
| 3,103,934 | 9/1963 | Sabourin | 132—33 |
| 3,141,464 | 7/1964 | Catania | 132—41 |
| 3,228,403 | 1/1966 | Pasternack | 132—36.2 |

GREGORY E. McNEILL, Primary Examiner

LOUIS G. MANCENE, Assistant Examiner

UNITED STATES PATENT OFFICE
CERTIFICATE OF CORRECTION

Patent No. 3,480,019                          November 25, 1969

Samuel J. Popeil

It is certified that error appears in the above identified patent and that said Letters Patent are hereby corrected as shown below:

Column 11, line 26, beginning with "6. A clip" cancel all to and including "outer leg." in line 4, column 12. Column 12, claims 8 and 9 should be renumbered claims 6 and 7; same column 12, line 14, claim reference numeral "8" should read -- 6 --. In the heading to the printed specification, line 9, "9 Claims" should read -- 7 Claims --.

Signed and sealed this 13th day of October 1970.

(SEAL)
Attest:

Edward M. Fletcher, Jr.

Attesting Officer

WILLIAM E. SCHUYLER, JR.

Commissioner of Patents